Patented Oct. 5, 1937

2,094,931

UNITED STATES PATENT OFFICE 2,094,931

PROCESS OF SEPARATING EXTRACTIVE SUBSTANCES FROM BODY FLUIDS

Hermann Eduard Schultze, Marbach, near Marburg/Lahn, Germany, assignor to Winthrop Chemical Company Inc., New York, N. Y., a corporation of New York No Drawing. Application December 21, 1933, Serial No. 703,493. In Germany December 24, 1932

7 Claims. (Cl. 167—74)

The present invention relates to a process of separating extractive substances from humors.

Certain fluids of the animal body and certain parts of plants are a source of substances such as vegetable and animal lipoids, which have a particular value as remedies besides their general importance in the development of the body and nutrition. Frequently the curative value of a lipoid fraction, for instance from some organs and glands or certain parts of plants, is due to a high content of hormones and vitamines which are of great importance with regard to the regulation of the human metabolism. The careful separation of "extractive substances" from other matters contained in the raw material is, therefore, an important problem. Furthermore, it may be important to eliminate quantitatively from the fluids or other matter such "extractive substances" as have a disturbing action.

I have now found that extractive substances can be obtained in an advantageous manner from the kind of raw material referred to in the preceding paragraph, for instance from cells and cellular fluids, by treating the material with a substance which reduces the surface tension.

For instance, the lipoids and other extractive substances can be extracted in a simple manner from the raw material by means of a substance which is a solvent of fat, is indifferent to albumin, is sparingly soluble in water and reduces the surface tension of water; such a substance is alcohol of high molecular weight. For instance, octyl alcohol has proved to be suitable; it is known that among the alcohols of high molecular weight octyl alcohol most readily reduces the surface tension of water. There may likewise be used in the same manner for instance decyl alcohol, nonyl alcohol, heptyl alcohol, hexyl alcohol, amyl alcohol or mixtures of two or more of these alcohols.

The lipoids can be obtained from cells or cellular fluids as follows: The alcohol is intimately mixed in the cold with the raw material by shaking or passing nitrogen through the material and the mixture of lipoid and alcohol thus obtained is separated from the rest of the material by skimming, centrifuging or filtering. Owing to the high solubility of lipoids in the alcohols of high molecular weight a very small proportion of the alcohol is sufficient for liberating the extractive substances from their cellular union and for absorbing them so that in comparison with the known extraction processes, a considerable quantity of extracting agent is saved. The extracted substance is freed from the solvent in known manner by evaporation in the cold. As in the process described the biological activity of the extractive substances as well as of the residual substances in the aqueous solution is not weakened, the process is advantageous also in those cases where it is desirable, for special reasons, to eliminate the extractive substances, for instance when therapeutically active solutions of albumin or carbohydrate are purified.

Instead of the said capillary-active alcohols there may also be used with good success for extracting the extractive substances other liquids which are solvents of fats which are sparingly soluble in water and have a small or no active surface, provided water-soluble substances of a strong capillary activity are simultaneously added to the extraction mixture. There may be used for this purpose particularly substances of the soap type and compounds of a similar composition, among others compounds obtainable by causing ethylene oxide to act upon alcohols, amines or carboxylic acids, for instance according to the process described in the co-pending U. S. Patent No. 1,970,578. These compounds containing polyglycol radicals may be prepared by treatment of alcohols, amines or carboxylic acids used as starting materials with corresponding quantities of ethylene oxide or substances forming the same, such as alkylene halogenhydrins, if desired, with the employment of condensation catalysts, such as surface-active substances, as for example bleaching earths or active charcoal, strongly acid substances as for example sulfuric or phosphoric acids or sodium or potassium bisulfates, or also strongly alkaline agents, such as caustic soda or alkali metal alcoholates and/or with the employment of increased pressure, if desired at elevated temperature, such as from about 80° C. to 200° C., preferably between 100° C. and 150° C., whereby the ethylene oxide molecules arrange themselves with the formation of long chained polyglycols. Depending on the amount of ethylene oxide employed it is possible to add one, four or more —$C_2H_4$— groups to each other by means of ether linkages. On the other hand the at least quadruple polyglycol ethers may be first formed in known manner and then condensed in known manner with the compounds containing reactive hydrogen atoms to form therewith esters, ethers and so on. Furthermore, there may be used the esters of higher molecular fatty acids with sulfonated alcohols described for instance in U. S. Patents Nos. 1,881,172 and 1,916,776. As solvents for fats which are insoluble in water or sparingly soluble in water there may, for instance be used aliphatic and aromatic hydrocarbons, such as toluene, xylenes or the like; furthermore, halogenated hydrocarbons, such as chloroform, methylene chloride.

The process may generally be effected at room temperature.

When operating in the cold at definite pH values and with exclusion of air it is possible also to isolate extractive substances which are liable readily to decompose and, when other methods are applied, are decomposed in part by the use of raised temperatures or by an extraction of too long a duration. In comparison with the known and often applied method of first dehydrating the material to be extracted and then to treating it with organic solvents, the new process involves the great advantage that the extractive substances are isolated in a single phase and that the dissolved condition of the lipoids is not changed by dehydration, a change which formerly has very unfavorably influenced the extraction conditions.

The process may be applied to cellular tissues or expressed cellular juices, such as expressed juices from liver, spleen or testicle, or to blood without any pre-treatment of the raw material. The extracting agent selected in accordance with the invention prevents the changes produced in the cellular colloids which have always been noticed in the known direct extraction processes. If ether and similar extracting agents are used in the known processes, there are formed, as undesirable accompanying changes, adsorptive combinations of the extractive substances with degradation products of albumen and carbohydrates which can be separated only with difficulty. Similar inconveniences occur if benzene and other hydrocarbons are used. It must, therefore, be regarded as a particular advantage of the present process that an extraction of the material to be extracted succeeds without the usual hindrance due to constituents other than the extractive substances.

The following examples illustrate the invention, without limiting it thereto:

(1) 10 liters of juices expressed from liver and of pH value 6.8 to 7.2 are mixed with 50 cc. of octyl alcohol. Nitrogen is caused to pass for 3 to 4 hours through the mixture, while cooling it with ice. The lipoids which are separated in a semi-liquid to solid condition are caught on a filter together with the adhering alcohol and freed from the latter by evaporation under reduced pressure.

Instead of octyl alcohol there may be used other alcohols which reduce the surface tension, for instance, nonyl alcohol, hexyl alcohol, or another organic substance which reduces the surface tension and dissolves fat.

(2) 5 liters of blood serum are mixed at room temperature with about 25 cc. of octyl alcohol and agitated. During this shaking process the lipoids are separated in a semi-liquid to solid condition. They can be eliminated from the serum by centrifuging or filtering. There is thus obtained a blood serum which is nearly free from lipoids.

I claim:

1. The process which comprises precipitating the lipoid substances from expressed juices from liver by means of octyl alcohol, while cooling, filtering the reaction-mixture and evaporating the octyl alcohol from the precipitate.

2. The process which comprises precipitating the lipoid substances from blood serum by means of octyl alcohol and isolating the serum nearly free from lipoid substances by filtering the reaction-mixture.

3. The process which comprises initially treating with an alcohol containing at least 5 and not more than 11 carbon atoms a body fluid, as such, mechanically separating the alcoholic extract from the body fluid, and liberating the extracted substance from adhering alcohol.

4. The process which comprises initially treating with an alcohol of the formula $$C_nH_{2n+1}OH$$

wherein $n$ stands for one of the integral numbers from 6 to 11, a body fluid, as such, mechanically separating the alcoholic extract from the body fluid, and liberating the extracted substance from adhering alcohol.

5. The process which comprises initially treating with a mixture of different alcohols of the formula $$C_nH_{2n+1}OH$$

wherein $n$ stands for one of the integral numbers from 6 to 11, a body fluid, as such, mechanically separating the alcoholic extract from the body fluid, and liberating the extracted substance from adhering alcohol.

6. The process which comprises precipitating lipoid substances from a body fluid, as such, by initially treating the latter with an alcohol of the formula $$C_nH_{2n+1}OH$$

wherein $n$ stands for one of the integral numbers from 6 to 11, mechanically separating the resulting alcoholic extract containing lipoid substances from the residual body fluid, and liberating the lipoid substances from adhering alcohol.

7. The process which comprises precipitating lipoid substances from a body fluid, as such, by initially treating the latter with a mixture of different alcohols of the formula $$C_nH_{2n+1}OH$$

wherein $n$ stands for one of the integral numbers from 6 to 11, mechanically separating the resulting alcoholic extract containing lipoid substances from the residual body fluid, and liberating the lipoid substances from adhering alcohol.

HERMANN EDUARD SCHULTZE.